United States Patent [19]

He

[11] Patent Number: 5,384,452

[45] Date of Patent: Jan. 24, 1995

[54] QUASI-ONE-DIMENSIONAL FOCAL PLANE ARRAY FOR VISION SCANNERS

[75] Inventor: Duanfeng He, Duluth, Ga.

[73] Assignee: NCR Corporation, Dayton, Ohio

[21] Appl. No.: 59,205

[22] Filed: May 10, 1993

[51] Int. Cl.⁶ .............................................. G06K 7/10
[52] U.S. Cl. ................... 235/462; 235/463; 235/454
[58] Field of Search ............... 235/454, 462, 472, 463; 382/59; 358/474, 482, 483, 486

[56] References Cited

U.S. PATENT DOCUMENTS

| | | | |
|---|---|---|---|
| 4,147,928 | 4/1979 | Crean ................... | 235/454 |
| 4,282,425 | 8/1981 | Chandima, Jr. et al. ......... | 235/462 |
| 4,335,302 | 6/1982 | Robillard ............... | 235/462 |
| 4,408,344 | 10/1983 | McWaters et al. ............ | 382/62 |
| 4,717,818 | 1/1988 | Brookman ............... | 235/462 |
| 4,818,856 | 4/1989 | Matsushima ............. | 235/472 |
| 4,831,275 | 5/1989 | Drucker ................ | 250/566 |
| 4,877,949 | 10/1989 | Danielson .............. | 235/462 |
| 5,019,694 | 5/1991 | Collins, Jr. ............ | 235/383 |
| 5,023,922 | 6/1991 | Abramovitz ............ | 382/59 |
| 5,155,344 | 10/1992 | Fardeau ................ | 235/462 |

FOREIGN PATENT DOCUMENTS 0150184  8/1985  Japan ................................. 235/462
2264383 10/1990  Japan ................................. 235/472

Primary Examiner—Davis L. Willis
Assistant Examiner—Karl D. Frech
Attorney, Agent, or Firm—Paul W. Martin

[57] ABSTRACT

A quasi one-dimensional focal plane array for vision scanners which records a portion of an image of a bar code label which is substantially less than the entire image of the bar code label. The focal plane array has more than 1000 columns of pixels and less than 100 rows of pixels for producing the image of the portion of a bar code label. Additional portions are scanned by the focal plane array as the portions move across the focal plane array. A vision scanner employing the quasi-one-dimensional focal plane array requires only enough memory to store the image of the portion of the bar code label. Each image is recorded, stored, and decoded in turn. The image of the bar code label may be demagnified. A system employing such a vision scanner is located at a distance high enough from an article conveyor to provide a substantially uniform depth of field, despite variations in the height of the articles.

16 Claims, 2 Drawing Sheets

QUASI-ONE-DIMENSIONAL FOCAL PLANE ARRAY FOR VISION SCANNERS

BACKGROUND OF THE INVENTION

The present invention relates to focal plane arrays (FPAs) within solid state camera devices, and more specifically to a quasi-one-dimensional focal plane array for vision scanners, where a quasi-one-dimensional FPA is defined to be one having a ratio of pixels in two directions of greater than about 5:1. The invention also relates to a system employing a quasi-one-dimensional FPA scanner.

Vision scanners generally include a camera. A focal plane array (FPA) in the camera converts the optical image into electrical signals. The most common type of FPA is a charge coupled device (CCD).

Items containing bar code labels are not necessarily of the same shape or size, and the location of the bar-codes on the items is not the same on every package. A bar-code may be small, compared to the total size of the item. Thus, typical vision cameras employ one or two-dimensional FPAs. One-dimensional FPAs are those which have many pixels arranged in a line. Two-dimensional FPAs are those having a ratio of pixels in the two directions between 1:1 to 2:1. Such FPAs have many pixels, which allows the vision camera to achieve a high resolution and capture detailed bar code information over a large area. However, typical two-dimensional FPAs are expensive, due to the large number of pixels. They also require a significant amount of memory to store and process image information.

Therefore, it would be desirable to provide an FPA for vision scanners which balances cost with resolution, coverage, and memory capacity.

SUMMARY OF THE INVENTION

In accordance with the teachings of the present invention, a quasi-one-dimensional focal plane array for vision scanners is provided. The quasi-one-dimensional focal plane array records a portion of an image of a bar code label which is substantially less than the entire image of the bar code label. Preferably, the focal plane array has more than 1000 columns of pixels and less than 100 rows of pixels for producing the image of the portion of a bar code label. Additional portions are scanned by the focal plane array as the portions move across the focal plane array. A vision scanner employing the quasi-one-dimensional focal plane array requires only enough memory to store the image of the portion of the bar code label. Each image is recorded, stored, and decoded in turn.

It is accordingly an object of the present invention to reduce the amount of memory required by vision scanners.

It is another object of the present invention to provide a quasi-one-dimensional focal plane array for vision scanners.

It is another object of the present invention to provide a vision scanner employing a quasi-one dimensional focal plane array.

It is another object of the present invention to provide a vision scanner employing a quasi-one-dimensional focal plane array and which requires only enough memory to store an image of a portion of a bar code label which is substantially less than the image of the entire bar code label.

It is another object of the present invention to provide a system employing a vision scanner having a quasi-one dimensional focal plane array.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
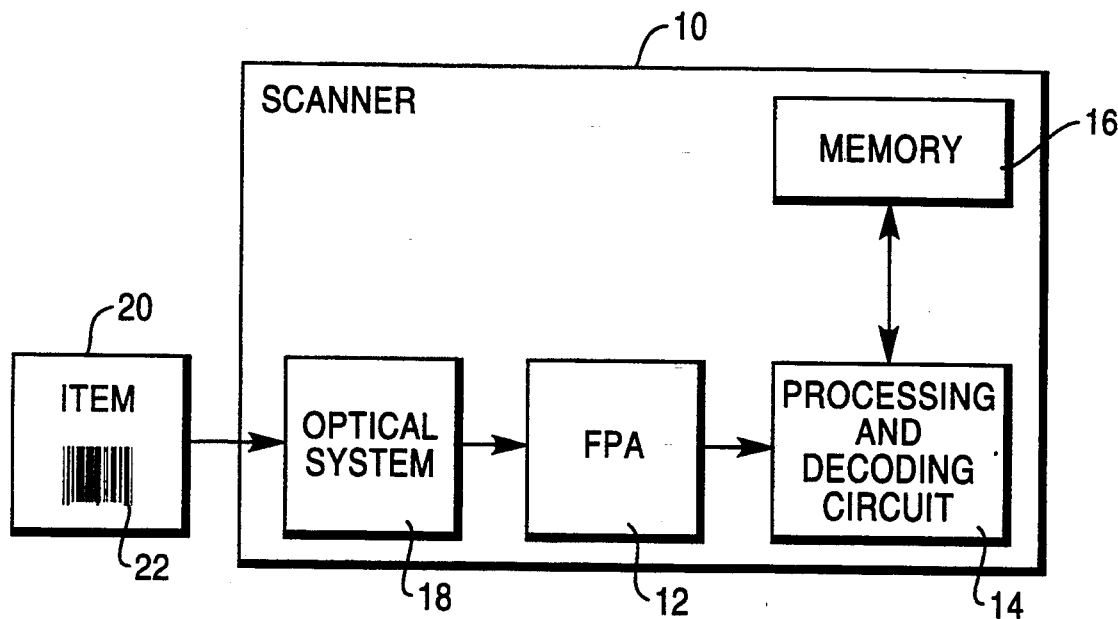
FIG. 1 is a block diagram of a vision scanner employing the quasi-one-dimensional FPA of the present invention.

Referring now to FIG. 1, vision scanner 10 includes quasi-one-dimensional FPA 12, processing and decoding circuit 14, memory 16, and optional optical system 18. Vision scanner 10 is preferably a CCD camera.

FPA 12 records an image of a portion of an item 20 having bar code label 22. FPA 12 is a quasi-one-dimensional FPA, which is an FPA with many pixels in one direction (preferably more than 1000) and much fewer pixels in the other direction (preferably less than 100).

Processing and decoding circuit 14 controls operation of the scanner and converts image information from FPA 12. Processing and decoding circuit 14 employs known methods to detect bars and spaces, determine the width of the bars and spaces, determine the relative positions of the bars and spaces, and resolve overlaps between image portions. Preferably, bar code information is accepted when an entire bar code is processed and decoded.

Memory 16 stores, among other things, the images of portions of item 20 and bar code 22 which are exchanged for the associated decoded information returned by processing and decoding circuit 14. Only one portion of item 20 is processed at a time. Thus, the amount of memory 16 is substantially less than is required when recording the entire image.

Optical system 18 images the field of view of scanner 10 onto FPA 12. Optical system 18 may be part of scanner 10 or may be separately housed and mounted.

Figure 3:
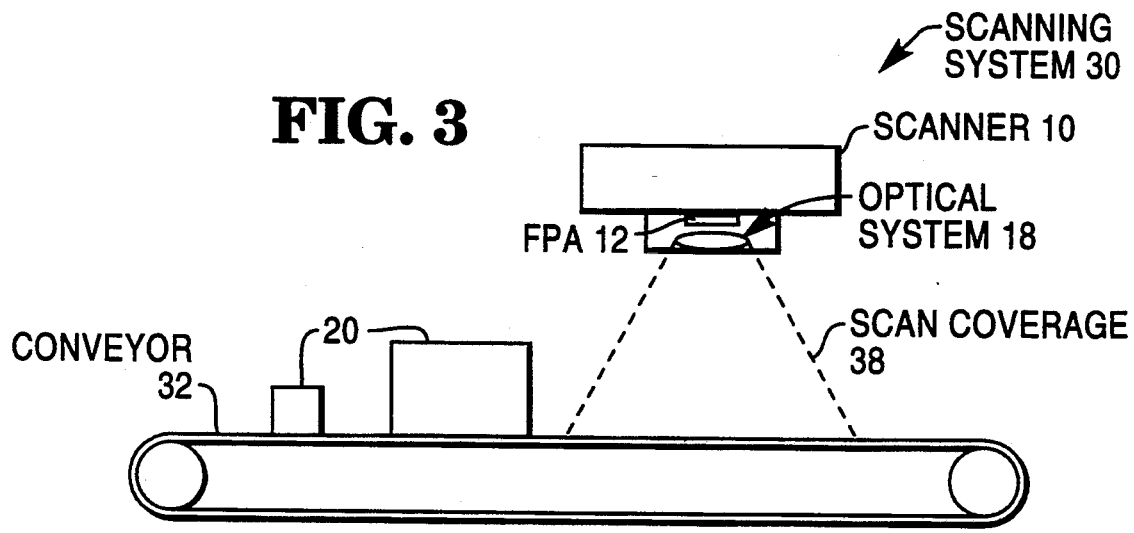
FIG. 3 is a side view of the system of FIG. 2.
Figure 2:
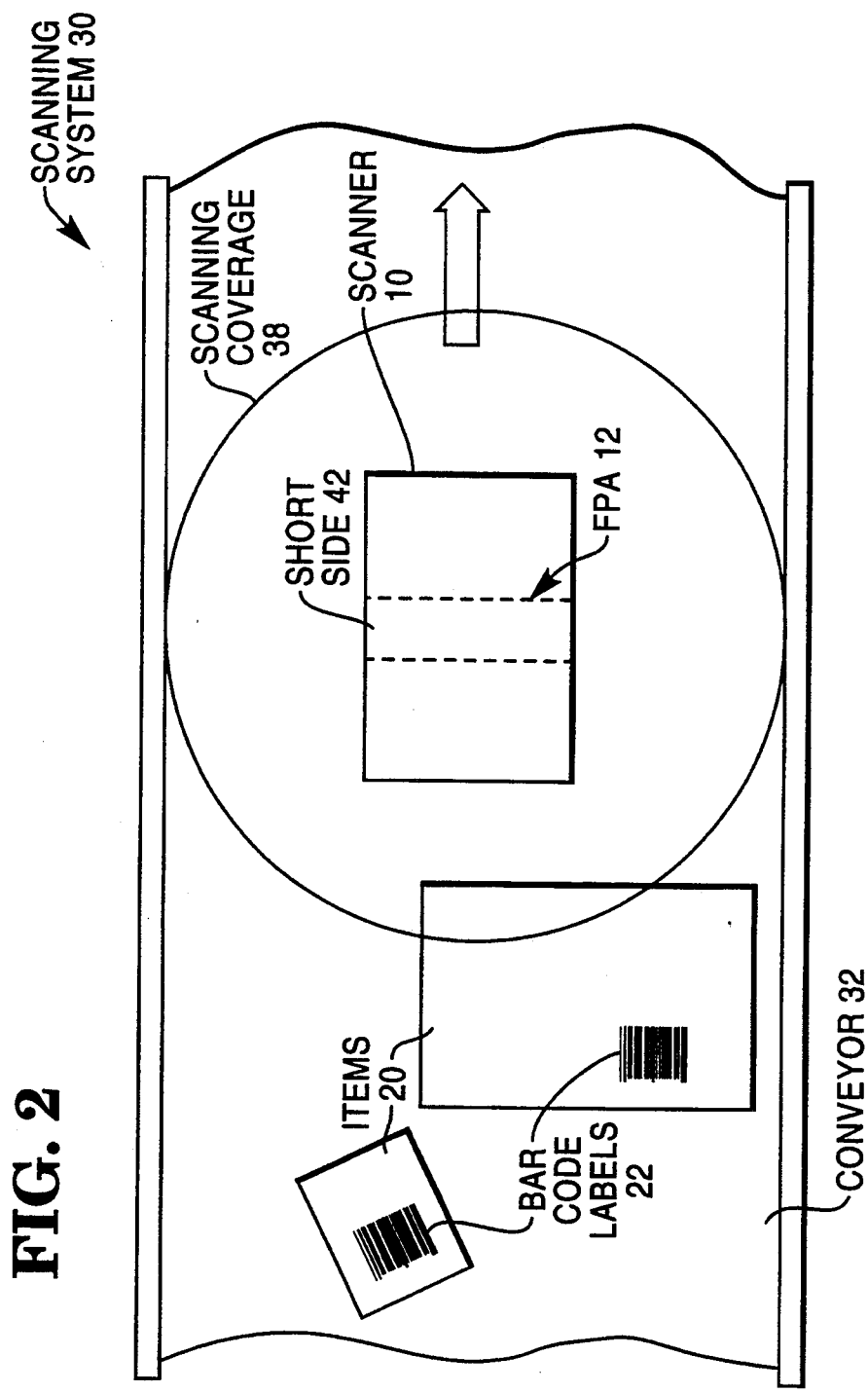
FIG. 2 is a top view of a scanning system employing the quasi-one-dimensional FPA of the present invention.

Referring now to FIGS. 2 and 3, a scanning system 30 is shown, which includes conveyor belt 32 for moving items 34 having bar code labels 36 past scanner 10. Optical system 18 images overall scanning coverage, represented by cone 38, with coverage across conveyor 32 extending the full width of conveyor 32. Preferably, optical system 18 demagnifies the image. Bar code labels 36 may be very small relative to the size of the overall image captured.

Vision scanner 10 may be mounted to the side of conveyor belt 32 or over top of it. Scanner 10 records the image of items 20, including bar code labels 22, as they move past.

The invention disclosed here suggests using quasi-one-dimensional FPA 12, which utilizes the continuous movement of conveyor belt 32 as part of the scanning process. Short side 42 of quasi-one-dimensional FPA 12 along the direction conveyor belt 32 is not wide enough to cover an entire item. This coverage is provided by scanning during movement of conveyor belt 32. Pieces of a bar code that come into view several rows at a time are combined as they appear. Since the number of pixels in quasi-one-dimensional FPA 12 is much less than the number of pixels in a two-dimensional FPA, much less memory is required.

Unlike other scanner systems, such as fax machines, the speed of conveyor belt 32 is not uniform. Thus, one-dimensional FPAs would not be able to compensate for the changes in speed. When quasi-one-dimensional FPA 12 is employed, at least one bar is captured per frame. Thus, bar code width is not time dependent, as it is in one-dimensional FPAs. When quasi-one-dimensional FPA 12 is employed, it is easier for the scanner to compensate for the non-uniform speed of conveyor belt 32, and it is easier for the scanner to find and decode a bar-code, especially as the number of pixels along short side 42 increases.

Advantageously, this approach is much less costly, compared to using a camera with a two-dimensional FPA. This approach also requires less memory to store image information.

For a vision scanner, the instantaneous image seen by the camera (or the FPA, to be more exact) is stored in memory and processed by a processor. For a scanner with a 2-dimensional FPA covering small details in a large area, the memory required is also large. With the quasi-one-dimensional FPA, the memory requirement is reduced because only a portion of the bar code is processed at a time as each portion enters the field of view. An image of an entire bar code does not reside in memory at any time. A decoded bar requires much less memory than the image of the bar.

Another feature of the system of FIGS. 2 and 3, is the fact that scanner 10 is mounted high enough from conveyor belt 32 so as to provide a substantially uniform depth of field, despite variations in the height of items 20.

Although the present invention has been described with particular reference to certain preferred embodiments thereof, variations and modifications of the present invention can be effected within the spirit and scope of the following claims.

What is claimed is:

1. A vision scanner comprising:
   a focal plane array having at least two rows of pixels for producing a plurality of images of a plurality of portions of a bar code label as the portions move across the focal plane array, wherein each of the images is substantially smaller than an image of the entire bar code label; and
   circuit means for decoding the images of the portions, only one image at a time, after the one image has been produced, and for combining the decoded images to decode the bar code label.

2. The vision scanner as recited in claim 1, further comprising:
   a memory for storing the one image after it has been produced and for storing the corresponding decoded image in place of the one image, wherein the memory has a size which is only large enough to store the one image and all of the decoded images.

3. The vision scanner as recited in claim 2, wherein the focal plane array has a ratio of pixels of greater than about 5 columns of pixels for every row of pixels.

4. The vision scanner as recited in claim 3, further comprising a demagnifying optical system which demagnifies the image of the entire bar code label.

5. A vision scanner comprising:
   a focal plane array having a ratio of pixels of greater than about 5 columns of pixels for every row of pixels for producing a plurality of images of a plurality of portions of a bar code label as the portions move across the focal plane array, wherein each of the images is substantially smaller than an image of the entire bar code label;
   circuit means for decoding the image of the portions, only one image at a time, after the one image has been produced, and for combining the decoded images to decode the bar code label
   a memory for storing the one image after it has been produced and for storing the corresponding decoded image in place of the one image, wherein the memory has a size which is only large enough to store the one image and all of the decoded images; and
   a lens for demagnifying the image of the entire bar code label.

6. A method for scanning a bar code label comprising the steps of:
   moving a bar code label past a quasi-one-dimensional focal plane array;
   recording a plurality of images of portions of the bar code label which are substantially smaller than an image of the entire bar code label;
   storing the images of the portions in a memory only one image at a time;
   decoding the images of the portions only the one image at a time;
   storing the decoded images of the portions in the memory in place of the images of the portions and only one decoded image at a time; and
   combining the decoded images to decode the image of the entire bar code label.

7. The method as recited in claim 6, wherein the step of moving comprises the substep of:
   moving the bar code label at a plurality of speeds.

8. The method as recited in claim 6, further comprising the step of:
   demagnifying the image of the bar code label.

9. A vision scanning system comprising:
   a conveyor which carries articles having bar code labels;
   a vision scanner located at a distance from the conveyor which is mounted high enough from the conveyor to provide a substantially uniform depth of field, despite variations in the height of the articles; and
   a quasi-one-dimensional focal plane array within the vision scanner.

10. The scanning system as recited in claim 9, further comprising:
    a demagnifying optical system between the focal plane array and the articles.

11. The system as recited in claim 9, wherein the quasi-one-dimensional focal plane array comprises at least two rows of pixels for producing an image of a portion of one of the bar code labels, which is substantially smaller than an image of the entire bar code label.

12. The system as recited in claim 11, wherein the quasi-one-dimensional focal plane array has a ratio of pixels of greater than about 5 columns of pixels for every row of pixels.

13. The system as recited in claim 11, further comprising:

a memory for storing the image of the portion of the bar code label.

14. The system as recited in claim 13, wherein the bar code label has a plurality of portions which are scanned by the focal plane array as the portions move across the focal plane array.

15. The system as recited in claim 14, further comprising: circuit means for decoding only the one image at a time and for replacing the one image in the memory with the decoded image.

16. A vision scanning system comprising:
   a conveyor which carries articles having bar code labels;
   a vision scanner located at a distance from the conveyor which is mounted high enough from the conveyor to provide a substantially uniform depth of field, despite variations in the height of the articles;
   a quasi-one-dimensional focal plane array within the vision scanner including at least two rows of pixels for producing a plurality of images of a plurality of portions of a bar code label substantially smaller than an image of the entire bar code label, wherein the quasi-one-dimensional focal plane array has a ratio of pixels of greater than about 5 columns of pixels for every row of pixels;
   a demagnifying optical system between the focal plane array and the articles;
   a memory for storing the images of the portions of the bar code label, one image at a time; and
   circuit means for decoding only the one image at a time and for replacing the one image in the memory with the decoded image.

* * * * *

UNITED STATES PATENT AND TRADEMARK OFFICE
CERTIFICATE OF CORRECTION

PATENT NO. : 5,384,452
DATED : January 24, 1995
INVENTOR(S) : Duanfeng He

It is certified that error appears in the above-indentified patent and that said Letters Patent is hereby corrected as shown below:

Column 4, line 9, delete "image" and substitute --images--.

Signed and Sealed this

Third Day of October, 1995

Attest:

BRUCE LEHMAN

Attesting Officer    Commissioner of Patents and Trademarks